United States Patent [19]
Kish et al.

[11] Patent Number: 5,407,386
[45] Date of Patent: Apr. 18, 1995

[54] FAIL SAFE DRIVE SHAFT SYSTEM

[75] Inventors: Jules G. Kish, Milford; Charles J. Isabelle, Winstead, both of Conn.

[73] Assignee: United Technologies Corporation, Hartford, Conn.

[21] Appl. No.: 13,389

[22] Filed: Feb. 4, 1993

[51] Int. Cl.⁶ ............................ F16D 3/10; F16D 3/79
[52] U.S. Cl. ..................................... 464/099; 464/160
[58] Field of Search ..................... 464/160, 99, 147, 98

[56] References Cited

U.S. PATENT DOCUMENTS

| | | | |
|---|---|---|---|
| 2,550,580 | 4/1951 | McLeod et al. | 464/98 X |
| 3,041,857 | 7/1962 | Anderson et al. | 464/99 |
| 4,133,188 | 1/1979 | Cartwright | 464/99 |
| 4,276,758 | 7/1981 | Coman et al. | 464/99 X |
| 4,560,364 | 12/1985 | Cohen | 464/160 X |
| 4,802,882 | 2/1989 | Heidrich | 464/99 |

Primary Examiner—Daniel P. Stodola
Assistant Examiner—Eileen A. Dunn
Attorney, Agent, or Firm—Melvin P. Williams

[57] ABSTRACT

A fail safe, segmented drive shaft system includes a segment support assembly (16) comprising a ball bearing (26), for primary rotation, disposed within a journal bearing (28), for secondary rotation, which is disposed within an elastomeric damper (30) that has a vibration probe (34) placed in it for failure detection, and a coupling assembly (18) comprising a flexible diaphragm (66, 67) for primary, flexible coupling between segments and gear teeth (72, 73) which engage for secondary coupling upon failure of the diaphragm (66, 67). The teeth are not concentric with the rotational axis, so vibration indicates failure of the primary flexible coupling.

4 Claims, 1 Drawing Sheet

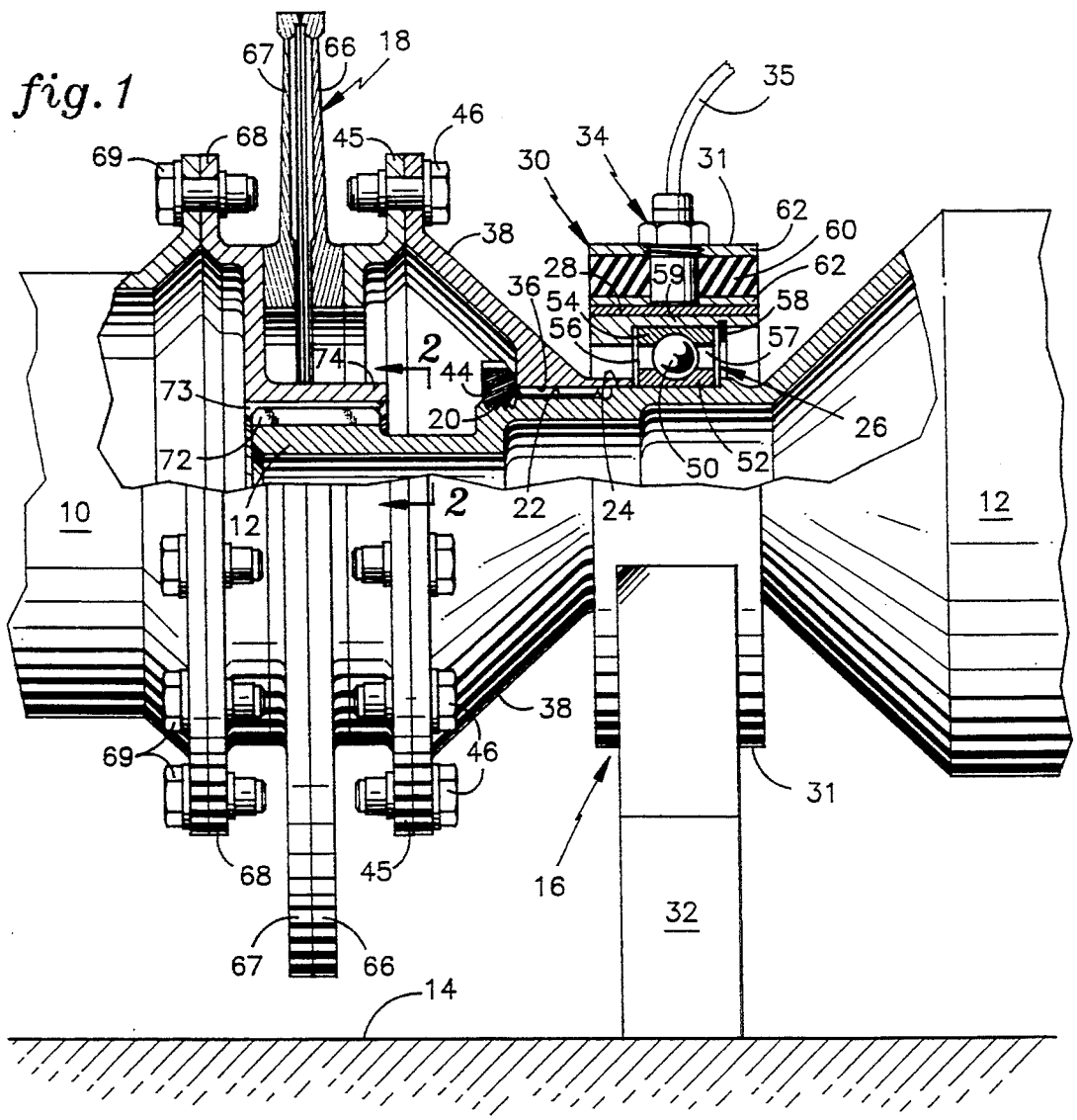
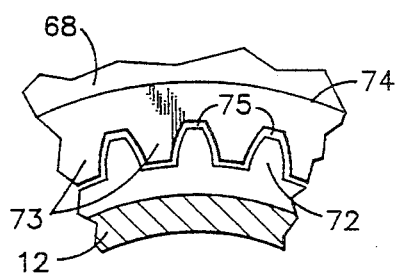

FAIL SAFE DRIVE SHAFT SYSTEM

TECHNICAL FIELD

This invention relates to fail safe, drive shaft couplings and bearings, such as may be used in a helicopter tail rotor drive shaft.

BACKGROUND ART

The power required to drive a helicopter tail rotor is typically delivered through a long, segmented drive shaft. The drive shaft is segmented to permit operation below critical vibration modes associated with rotary winged flight. Each segment must be rotatively supported by the aircraft airframe, and must be coupled to the next segment by means of an alignment-forgiving coupling to accommodate airframe deflections. In addition, the drive shaft must be lightweight, reliable and fail safe.

Typically, a tail rotor drive shaft assembly, which receives input from a main rotor gearbox and drives an intermediate gearbox located along the aft portion of and supported by the tail boom of the aircraft, comprises a plurality of shaft segments supported by rolling element bearing assemblies and coupled via alignment-forgiving torque drive assemblies. The rolling element bearing assemblies typically comprise a conventional ball bearing within a rubber bladder filled with viscous silicon fluid interposed between and isolating the outer race of the ball bearing from the airframe structure. The alignment-forgiving torque drive couplings typically comprise a series of thin disc members stacked together and bolted at three angular positions along a face surface of an end flange of one shaft segment and at three interspaced positions of another shaft segment. Field problems include cracking of the couplings, loss of the viscous damping fluid and seizure of the bearing assemblies. Bearing seizure is associated with friction contact of the ball bearing outer race with the airframe structure which results in an extreme overtemperature condition, having the potential for developing an inertia weld and loss of drive in the tail system. In addition, the bearing support and coupling assemblies require frequent and painstaking inspection associated with preventive maintenance. To complicate matters, the location of the drive shaft is not favorable for maintenance. All of these characteristics have been compounded by the fact that helicopters are operating at higher rotor RPM than ever before.

In U.S. Pat. No. 4,560,364 there is disclosed a flexible shaft coupling in which the primary, alignment-forgiving coupling comprises two spaced apart thin metal disks which are bonded together at their outer periphery. A backup coupling, which engages automatically only if the primary coupling fails, consists of a loose plug and socket arrangement. The male portion is significantly smaller than the female portion within which it will engage. Should the primary coupling fail, the unsupported shaft will have a degree of looseness, after torque to the rotor has been removed, that provides the ground crew observers a clue that the primary coupling has failed. However, this requires gaining access to the shaft for visual observation, and requires constant post-flight observation to detect when the primary coupling has failed.

DISCLOSURE OF INVENTION

Objects of the present invention include improved, fail safe drive shaft bearings and intershaft couplings, and a failure indication system that simplifies periodic maintenance.

According to the present invention, a drive shaft coupling comprises a flexible diaphragm primary coupling and loosely coupled teeth as a backup coupling. In accordance further with the invention, the teeth are disposed in concentric circles which are offset from the rotational axis of the shafts being coupled, so that when one shaft is driving the other through the teeth, there will be a sufficient, once-per-revolution vibration to be detected by a vibration detector mounted in the vicinity of the coupling, thereby providing an indication of primary coupling failure. The diaphragm may be metal, such as steel.

According to the invention still further, a shaft is rotatively supported by a complex bearing structure which includes a rolling element bearing disposed within a journal bearing, such as a polymer sleeve, which is, in turn, disposed within an annular support, so that should the rolling element bearing seize, its outer race can rotate within the polymer sleeve, and the polymer sleeve can rotate within the inner surface of the damper, thereby permitting rotation sufficiently to finish the flight. In further accord with the invention, a vibration detector is mounted directly within the support, whereby bearing failure followed by rotation of the bearing outer race within the sleeve and/or rotation of the sleeve within the support will induce sufficient vibration to be picked up by the detector and provide an indication of failure.

The present invention is fail safe because the coupling system and the support system have primary and secondary operation which allows the shaft to rotate and have the rotation imparted to the next shaft. This, in turn, allows an aircraft to continue flying (or other machinery to continue operating) upon failure of either one or both primary systems. Failure of any primary system is detectable by the vibration sensor. Also, the flexure and resonance characteristics of the present drive shaft system do not change dramatically over a wide operating temperature range because the temperature characteristics of the elastomeric support are more closely controlled than in the viscous-dampened support of the prior art. In addition, inspection for component failures is simplified.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a partially sectioned, partially broken away side elevation view of the drive shaft system of the present invention.

FIG. 2 is a partial sectional view taken along line 2—2 of FIG. 1.

BEST MODE OF CARRYING OUT THE INVENTION

Referring now to FIG. 1, drive shaft segments 10, 12 are two of a number of segments used to transfer power from a helicopter main gear box to a tail rotor. The number of segments needed in the system is dependent on the characteristics of each particular aircraft. Only the connection and support systems for two adjoining segments are shown for convenience. Segment 12 is rotatively connected to the aircraft mainframe 14 by a support assembly 16. The two segments are connected together by a flexible coupling assembly 18.

The shaft segment 12 has a reduced end consisting of a threaded end section 20 adjacent to a spline section 22 which is adjacent to a bearing contact section 24. The bearing contact section 24 is received within the inner race of a bearing assembly 26 that is disposed within a journal bearing 28 which is disposed within an elastomeric damper 30. The outer surface 31 of the elastomeric damper is attached to a support base 32 which is attached to the aircraft frame 14. A displacement or vibration probe 34 (such as a simple accelerometer) is inserted into the elastomer damper 30 and converts vibration (particularly at the primary, once per revolution frequency) of the support assembly 16 into an electrical signal on a cable 35.

The spline section 22 of segment 12 engages with a mating spline section 36 of a flange 38. An end cap nut 44 engages with the threaded end 20 of shaft segment 12 to secure the flange 38 and segment 12 to support 16. The flange 38 is connected to a flange 45 of the flexible coupling assembly 18 by bolts 46. A flange 68 on shaft segment 10 is attached to the opposite side of coupling assembly 18 by bolts 69.

The bearing assembly 26 may be a conventional ball bearing, designed to operate at the tail rotor RPM, having a plurality of balls 50 disposed between an inner rotatable race 52 and an outer non-rotating race 54. The bearing assembly 26 includes seals 56 for holding a lubricant within a chamber 57 surrounding the balls 50. The outer race 54 of the bearing assembly 26 is held in place by a snap ring 58 within an outer race retention sleeve 59 inside the self-lubricated journal bearing 28, which comprises a sleeve of plastic or sintered metal. The journal bearing 28 is disposed within the elastomeric damper 30, which comprises a compound rubber elastomer 60 bonded between composite phenolic or metal retainers 62.

The bearing engagement section 24 of segment 12 engages with the inner bearing race 52 for near frictionless rotation within the bearing assembly 26. The spline portion 22 of the shaft segment 12 engages with the spline portion 36 of the flange 38 to impart torque from the shaft segment 12 through the flange 38.

The flexible coupling assembly 18 provides an alignment-forgiving coupling system to couple the shaft segments 10 and 12 and comprises a first, round steel diaphragm 66 which is bonded to the flange 45 by an electron beam weld (or in another suitable fashion) and is similarly bonded to another round steel diaphragm 67 which is, in turn, similarly bonded to a splined flange 68. The flange 68 is secured to the shaft segment 10 by bolts 69. This type of flexible coupling (66, 67) is sometimes referred to as a Lucas coupling, available from Lucas Aerospace, Utica, N.Y. It allows shaft segments 10 and 12 to be slightly misaligned, by flexing as the shaft segments rotate. In the event that the flexible coupling 18 should rupture, a secondary coupling is made by engagement of splines comprising a plurality of teeth 72, 73 (FIG. 2) machined into the end of shaft segment 12 and an annular hub portion 74 of the flange 68, respectively. During normal operation, the teeth are separated by a small distance 75 so as not to interfere with the motion of segments 10, 12 and the flexing of the coupling 18. If the flexible coupling 18 becomes ruptured, a slight rotation between shaft segments 10 and 12 causes engagement of the teeth with one another.

In order to sense when the flexible coupling 18 has failed, the teeth 72, 73 are disposed in non-concentric circles. The center of the circle of male teeth 72 are offset from the normal rotational axis of the shaft (the axis of the bearing assembly 26) by about 0.010 inches, so as to induce a mild once-per-revolution vibration that can be picked up by the probe 34, whenever the backup splines are driving.

The bearing assembly 26 facilitates nearly frictionless rotation of shaft segment 12, but in the event bearing assembly 26 should seize, the outer bearing race 54 can rotate within the journal bearing 28 and the journal bearing 28 can rotate within the inner phenolic composite retainer 62. Journal bearing 28, therefore, provides the fail-safe rotation function of support assembly 16.

The compound rubber portion 60 of elastomeric support 30 provides a degree of isolation for the drive shaft system from the aircraft frame and also dampens the motion of the drive shaft system.

Displacement probe 34 is a transducer, such as an accelerometer which measures the acceleration of the support caused by once-per-revolution imbalance or an eddy current displacement sensor which measures the motion of the outer diameter of the journal bearing 28 and converts motion into an electrical signal on cable 35, which can be utilized by an electronic sensing and/or measurement systems (not shown herein, but well known in the art), to detect a one-per-revolution displacement which exceeds a predetermined allowable threshold and provide an easily perceptible indication that maintenance is required. However, the indication of failure need not be presented to a pilot, but only to ground maintenance personnel, if desired. Deterioration of the ball bearing assembly 26, the flexible coupling 18, or the shaft segments 10, 12 will cause abnormal excursions or vibrations that will be converted to an electronic signal by probe 34. The electronic signal is consequently utilized by the measurement system to provide an indicator (such as an LED display) which can be viewed during a quick, post flight check to alert maintenance personnel of a possible problem. Probe 34, therefore, eliminates the need for routine, time consuming visual inspections of the entire tail rotor drive shaft. The indicators for each drive shaft segment may be centralized to keep the post flight check time to a minimum.

The bearing and coupling improvements of the invention can be used in a wide variety of non-aircraft applications, with different rolling element bearings, and with different flexible couplings, as well. The flexible coupling 18 could possibly be composed of glass fibers imbedded in a soft matrix of urethane, as is well known in the prior art. The teeth 72 could be provided on an annular hub portion of the flange 45 (similar to hub 74 of flange 68), if desired. In such case, the diameter of the roots of the teeth 72, 73 could be much larger. The flange 38 could be threaded or pinned onto the shaft segment 12, so long as it is locked in place, obviating the need for the nut 44 and the splines 22, 36. The flanges (or equivalent members) could be secured to the shaft segments 10, 12 in other ways as well.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fail safe coupling assembly for coupling a rotating driving shaft to a rotating driven shaft, comprising:

a first set of teeth disposed in a circle on an end of a first one of said shafts adjacent to an end of a second one of said shafts in a plane normal to the rotational axis of said first shaft;

a second set of teeth disposed on an end of said second shaft facing said first shaft in a plane normal to the rotational axis of said second shaft in a circle generally concentric with the circle of said first set of teeth, said second set of teeth interleaved with said first set of teeth, the size of said teeth being sufficiently small with respect to the spacing of said teeth so as to permit rotational slack between the teeth of said first set and the teeth of said second set; and a flexible diaphragm structure interconnecting said ends of said shafts to provide a flexible coupling between said shafts, said teeth being oriented, with said diaphragm intact, so that the teeth of said first set are provided with clearance, including said rotational slack, with respect to the teeth of said second set so that said coupling is flexible so long as said diaphragm structure is intact, but rupture of said diaphragm structure will permit mutual rotation of one of said sets of teeth with respect to the other until the teeth engage whereby to provide backup coupling between said shafts;

characterized by the improvement comprising:

said first set of teeth disposed with the center of its circle offset from the rotational axis of said first shaft by a small fraction of an inch; and a vibration probe disposed adjacent to one of said shafts in the vicinity of said coupling assembly in a manner to provide an electrical displacement signal indicative of vibrational motion imparted to said probe by said one shaft;

whereby deterioration of said diaphragm coupling structure will cause abnormal vibration in said vibration probe which may be detected by monitoring said electrical displacement signal.

2. A coupling assembly according to claim 1 wherein said teeth of each set extend radially from the end of the corresponding one of said shafts in the direction of the teeth of the other of said sets.

3. A coupling assembly according to claim 2 wherein said diaphragm structure is metal.

4. A coupling assembly according to claim 3 wherein said diaphragm structure is steel.

* * * * *